Oct. 1, 1963 A. HERLET 3,105,926

ENCAPSULED ELECTRONIC SEMICONDUCTOR DEVICE OF THE FOUR-LAYER JUNCTION TYPE, AND METHOD OF ITS PRODUCTION

Filed Jan. 25, 1962

3,105,926

ENCAPSULED ELECTRONIC SEMICONDUCTOR DEVICE OF THE FOUR-LAYER JUNCTION TYPE, AND METHOD OF ITS PRODUCTION

Adolf Herlet, Pretzfeld, Germany, assignor to Siemens-Schuckertwerke Aktiengesellschaft, Berlin-Siemensstadt, Germany, a German corporataion Filed Jan. 25, 1962, Ser. No. 168,757
Claims priority, application Germany Jan. 28, 1961
9 Claims. (Cl. 317—234)

My invention relates to silicon-controlled rectifiers and other gas-tightly encapsuled electronic semiconductor devices of the four-layer junction type, having four layers or zones of alternately different conductance type (n-p-n-p) whose layer area is large in comparison with the layer thickness, one of the outer layers being provided with an annular electrode around a central contact for the adjacent intermediate layer.

According to my invention the annular electrode of the outer semiconductor layer is joined with an electric connector piece of hollow cylindrical shape in which a hollow and preferably flexible conductor is fastened. The hollow conductor is connected with an upper portion of the encapsulating housing of the semiconductor device and is electrically insulated from the lower portion of the housing. The conductor for the adjacent intermediate layer of the semiconductor extends through the hollow conductor and through the housing top portion in electrically insulated relation thereto.

By virtue of these features, an encapsuled four-layer semiconductor device according to the invention achieves the objects and affords the advantages that the electric connection for the current-conducting main electrode of the semi-conductor body can be given any desired large size within much wider limits than heretofore available, and that the vacuum-tight or gas-tight seal for the connecting leads for the current-conducting main electrode and for the adjacent intermediate layer can be produced in a single manufacturing step by means of a relatively simple squeezing or pressing operation.

It will be understood that in a silicon-controlled rectifier or other four-layer p-n-p-n junction device of the type here involved, the other main electrode is conductively joined with the bottom portion of the housing which thus simultaneously serves as a current supply terminal, relatively little difficulty being encountered at this location to provide for contact engagement of sufficiently large area. As a rule, the above-mentioned intermediate layer serves as a gate, firing or ignition electrode for initiating the conducting interval of the p-n-p-n device.

The above-mentioned and more specific objects, advantages and features of my invention, said features being set forth with particularity in the claims annexed hereto, will be apparent from and will be described in, the following with reference to the embodiment of a silicon-controlled rectifier illustrated by way of example in the accompanying drawing, in which:

Figures 1, 2, 3:
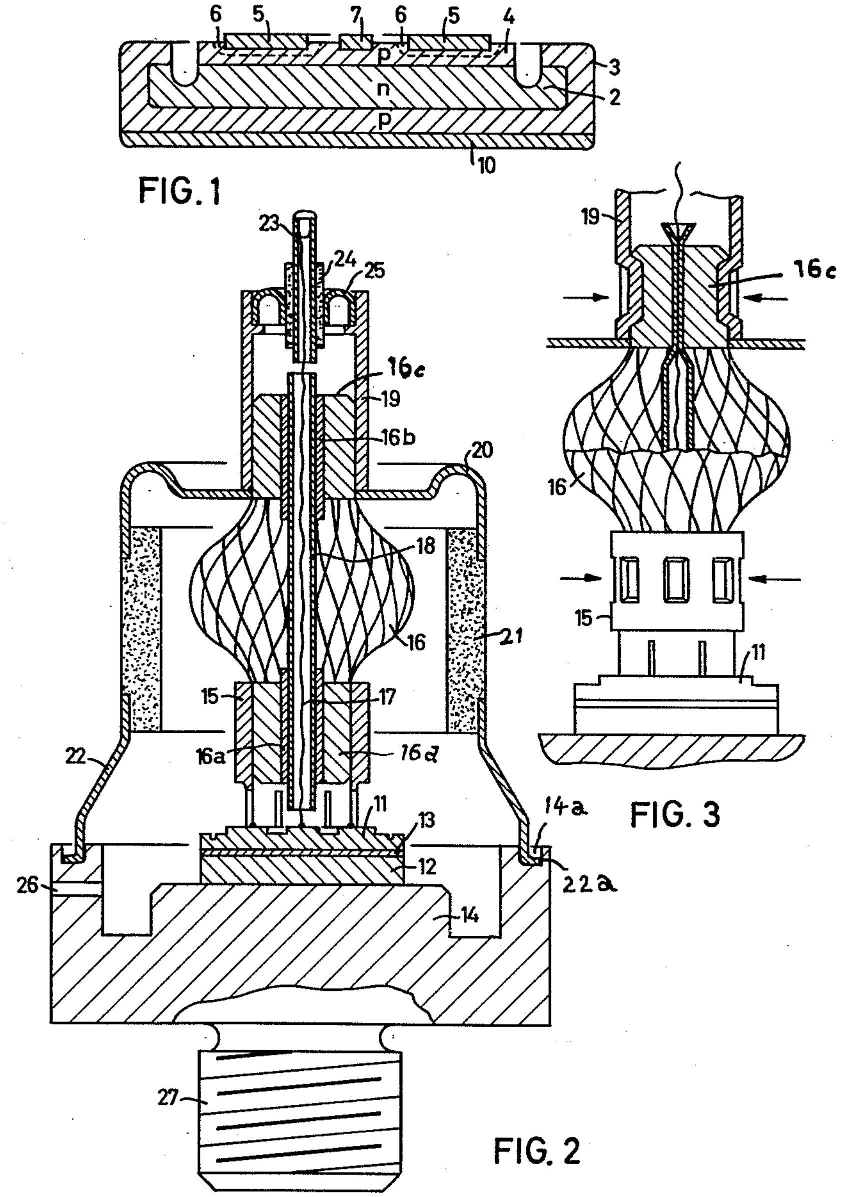
FIG. 1 shows schematically a four-layer semiconductor element suitable for the purpose of the invention.
FIG. 2 shows in axial section an encapsuled semiconductor device comprising the element shown in FIG. 1.
FIG. 3 shows partly in section some details of FIG. 2 in finished condition of the device.

The semiconductor element according to FIG. 1 comprises a semiconductor disc 2 consisting, for example, of monocrystalline n-type silicon having a thickness of about 250 microns. By diffusing a p-doping substance, for example aluminum, into the silicon, the disc is provided with a p-type surface layer 3 of about 60 micron depth, for example. The layer 3 can be formed by heating the original n-type disc to about 1200° C. for forty hours in an evacuated quartz vessel in the presence of aluminum. A ring-shaped groove is etched or milled into the upper flat surface of the disc thus prepared, the depth of the groove is everywhere larger than the thickness of the p-type layer 3 diffused into the disc, so that a circular layer 4 is separated from the p-type layer 3. Alloyed into the p-type layer 4 is a ring-shaped gold foil 5 containing approximately 0.5% antimony, to serve as a current-conducting main electrode. After cooling the alloyed element, an n-type zone 6 is produced, and the boundary between zones 6 and 4 forms a p-n junction schematically represented by a broken line.

Located in the central opening of the current-conducting main electrode 5 is a disc-shaped ignition electrode 7 consisting, for example, of a gold foil which contains approximately 0.05% boron. This foil forms a barrier-free (ohmic) contact with the p-type layer 4. The p-type layer on the opposite flat side of the semiconductor body is likewise joined by alloying with an electrode 10 of the same or a similar composition as the ignition electrode 7 and forms likewise a barrier-free contact. The electrode foils 5, 7 and 10 may each have approximately 30 to 50 microns thickness, they are preferably simultaneously alloyed into the silicon body in one and the same operation at a temperature of about 700° C. The electrodes 5 and 6, serving for conducting the main current through the semiconductor element, are in contact with the two outer layers 6 and 3 respectively of the four-layer n-p-n-p semiconductor element.

In FIG. 2 the semiconductor element is denoted by 11. This element may have the same design as the one described above with reference to FIG. 1 and, for simplicity, is shown only by its outer contours. The element 11 is soldered onto a molybdenum plate 12 at a temperature of about 400 to 500° C. For better adhesion, the molybdenum plate 12 may be previously plated electrolytically with a gold or silver coating 13. The molybdenum disc 12 is fastened to the bottom portion 14 of the encapsulating housing, for example by soldering at about 800° C. The bottom portion 14 of the capsule consists of a good heat-conducting material, for example copper.

In the same operation with the fastening of the semiconductor body to the molybdenum plate 12, or in a separate step of operation, the main electrode 5 and the ignition electrode 7 on the upper plate side of the element 11 are joined with respective electric terminal leads. The connecting structure for the annular main electrode 5 has generally the shape of a crown and consists of a hollow cylinder 15 whose lower portion is peripherally undercut over an axial length of about 2 to 4 mm. down to a thickness of about 0.2 to 0.4 mm. The remaining portion of the thin cylinder wall is provided with several, for example six, slits which may have 0.5 mm. width and extend in the axial direction of the cylinder. Preferably the slits are uniformly distributed over the periphery. The remaining portions of the cylinder wall thus form resilient tongues. The crown 15 consists of an electrically good conducting material whose melting point is considerably higher than the eutectic temperature of the electrode material and of which only a slight portion becomes dissolved when the electrode material melts. In conjunction with a silicon semiconductor body and a gold-containing alloy electrode, the use of silver for the crown 15 has been found of advantage. To secure better wetting, the silver crown may be gilded.

Inserted into the upper opening of the hollow cylinder or crown 15 is the end of a hollow conductor 16 of copper consisting of a middle flexible portion and two massive ends. In the embodiment shown the hollow conductor 16 consists of a tubular cylindrical web of copper. It can be produced by shoving respective rigid tubular pieces 16*a* and 16*b* into the two ends of the tubular web, the tube pieces having an inner width of about 2 to 4 mm. and consisting of pressure-resistant material such as steel. Then the ends are pressed together by external mechanical pressure. Thereafter the tubular pieces can be pulled out of the ends of the tubular web or they may remain in the tubular ends. The lead 17 connected to the ignition electrode 7 (FIG. 1) may be given the shape of a tape of small cross section and may consist of silver for example. The conductor passes through the hollow conductor 16 and is insulated therefrom by a tube 18 of high-temperature resistant elastic synthetic material, for example polytetrafluorethylene (Teflon). By applying uniform external pressure upon the periphery of the crown 15, the lower end of the conductor 16 is pressed and squeezed together whereby an electrically good conducting connection is secured. The upper end of the conductor 16 protrudes into a tubular connector piece 19 which serves for connecting an internal lead or conductor for the main electrode 5 and consists of electrically good conducting material such as copper. The connecting piece 19 is joined with a housing cap 20 of metal, for example by hard-soldering. The cap 20 of the encapsulating housing is joined with the bottom portion 14 of the housing by a cylindrical insulating body 21, preferably of ceramic material, and by a hollow cylindrical and upwardly tapering junction piece 22.

The upper end of conductor 17 is pulled through a sealing nipple 23 and is gas-tightly soldered or welded at the upper end of the nipple. The nipple 23 is formed by a tubular duct member arranged in a hollow cylindrical insulating body 24, for example of ceramic material. The insulating body 24 is centered and fastened by means of a ring-shaped connecting metal piece 25 of U-shaped profile which joins parts 24 and 23 with the tubular connecting piece 19.

The housing portions 19 to 22, as well as the inlead consisting of the tubular members 23 and 24 with the connecting piece 25 can be prefabricated, for example they can be hard-soldered to one another in a single preceding operation. For this purpose, it is of advantage to use for the housing portions 20, 22, 23 and 25 a material which can be joined with the ceramic bodies 21 and 24 in a relatively easy manner. This property is inherent, for example, in an allow consisting essentially of 54% iron, 24% nickel and 14% cobalt. Such an alloy is available in the trade under the name Vacon. The finished housing upper portion is inserted into an annular groove 14*a* of the bottom portion 14, and the intermediate piece 22 is then soldered or welded together with the bottom portion 14 or is gas-tightly joined with the bottom portion by cold deformation of the bottom portion, such as by upwardly bending or spinning the peripheral lower edge of the bottom portion 14. For this purpose, the lower end of the intermediate annular metal piece 22 is preferably provided with an outwardly protruding edge or flange 22*a*.

By applying mechanical pressure upon the periphery of the connecting piece 19, this operation being similar to the one used for joining the crown 15 with the conductor 16, a mechanically rigid and electrically good conducting connection with the conductor 16 is produced in a relatively simple manner. For this purpose, a device or jig, for example with six to ten radial plungers may be used which are uniformly distributed over the periphery of the cylindrical connecting piece 19 at the height of the massive end of conductor 16 and which are forced inwardly against piece 19. A bore 26 is provided in the bottom portion 14 for evacuating the encapsuled housing. A threaded bolt 27 integral with housing portion 14 permits fastening the encapsuled semi-conductor device on a cooling block or other heat sink.

When producing the squeeze connection between the conductor 16 on the one hand and the connecting parts 15, 19 on the other hand, the pressure can readily be made so large that the connecting conductor 17 of the ignition electrode 7 and the insulating tube 18 are enclosed between the two massive ends 16*c* and 16*d* of the conductor 16 as is apparent from FIG. 3. A high pressure, for example a few (metric) tons per square centimeter, is of advantage in order to reliably secure an electrically good conducting contact. The force direction of such pressure, applied by means of light radial plungers, is indicated in FIG. 3 by arrows. The connecting conductor 17 is preferably subjected to some amount of upsetting or reduction in linear length, so that it assumes approximately meander shape. This has the advantage that in the event of thermal expansion in the axial direction of the conductor 16, and in the event of deformation of the housing, no tensile stresses are imposed upon the conductor 17 and no forces can occur at the junction points of the conductor 17 with the ignition electrode 7 on the one hand and the sealing member 23 on the other hand.

While the invention is described also with reference to the example of a silicon device, it is also applicable to semiconductor four-layer elements of other materials such as germanium or gallium phosphide, indium antimonide and other semiconductor compounds.

To those skilled in the art, it will be obvious, upon studying this disclosure, that with respect to structural details, individual methods of manufacture and materials, my invention is amenable to modification and hence can be given embodiments other than particularly illustrated and described herein, without departing from the essential features of the invention and within the scope of the claims annexed hereto.

I claim:

1. Encapsulated four-layer semiconductor device, comprising a semiconductor element having four layers of alternately different conductance type and having a large layer area relative to the thickness of each layer, a sealed housing having two mutualy insulated portions of metal of which one is conductively connected with one of the outer layers of said element; an annular electrode disposed on the other outer layer of the element, a contact on said element surrounded by, but insulated from said electrode and conductively joined with the one intermediate layer in said semiconductor element that is adjacent to said other outer layer; a rigid hollow cylindrical connector piece coaxially joined with said electrode, a hollow yieldable conductor having one end coaxially joined with said connector piece and having the other end conductively joined with said other housing portion; and a lead connected to said contact and extending to the outside through said hollow conductor and through said other housing portion in insulated relation to both.

2. Encapsulated four-layer semiconductor device, comprising a semiconductor element having four layers of alternately different conductance type and having a large layer area relative to the thickness of each layer, a sealed housing having two mutually insulated portions of metal of which one is conductively connected with one of the outer layers of said element; an annular electrode disposed on the other outer layer of the element, a contact on said element surrounded by, but insulated from said electrodes and conductively joined with the one intermediate layer in said semiconductor element that is adjacent to said other outer layer; a rigid hollow cylindrical connector piece coaxialy joined with said electrode, a hollow yieldable conductor having one end coaxially joined with said connector piece and having the other end conductively joined with said other housing portion; a lead connected to said contact and extending to the outside through said hollow conductor and through said other housing portion in insulated relation to both, said hollow connector piece having reduced wall thickness over a portion of its length adjacent to said annular electrode, said portion of reduced wall thickness having slits distributed over the periphery and extending parallel to the axis of said connector piece whereby said connector piece is subdivided into yieldable tongues.

3. Encapsulated four-layer semiconductor device, comprising a semiconductor element having four layers of alternately different conductance type and having a large layer area relative to the thickness of each layer, a sealed housing having two mutually insulated portions of metal of which one is conductively connected with one of the outer layers of said element; an annular electrode disposed on the other outer layer of the element, a contact on said element surrounded by, but insulated from said electrode and conductively joined with the one intermediate layer in said semiconductor element that is adjacent to said other outer layer; a rigid hollow cylindrical connector piece coaxially joined with said electrode, a hollow yieldable conductor having one end coaxially joined with said connector piece and having the other end conductively joined with said other housing portion; a lead connected to said contact and extending to the outside through said hollow conductor and through said other housing portion in insulated relation to both; said hollow conductor having two massive ends and having a tubular flexible web portion extending between said ends.

4. In a semiconductor device according to claim 3, the bore of said hollow conductor having an inner diameter between 2 and 4 mm.

5. Encapsulated four-layer semiconductor device, comprising a semiconductor element having four layers of alternately different conductance type and having a large layer area relative to the thickness of each layer, a sealed housing having two mutually insulated portions of metal of which one is conductively connected with one of the outer layers of said element; an annular electrode disposed on the other outer layer of the element, a contact on said element surrounded by, but insulated from said electrode and conductively joined with the one intermediate layer in said semiconductor element that is adjacent to said other outer layer; a rigid hollow cylindrical connector piece coaxially joined with said electrode, a hollow yieldable conductor having one end coaxially joined with said connector piece and having the other end conductively joined with said other housing portion; a lead connected to said contact and extending to the outside through said hollow conductor and through said other housing portion in insulated relation to both; a hose of high-temperature resistant elastic synthetic material surrounding said lead for said contact for insulating said lead from said hollow conductor.

6. Encapsulated four-layer semiconductor device, comprising a semiconductor element having four layers of alternately different conductance type and having a large layer area relative to the thickness of each layer, a sealed housing having two mutually insulated portions of metal of which one is conductively connected with one of the outer layers of said element; an annular electrode disposed on the other outer layer of the element, a contact on said element surrounded by, but insulated from said electrode and conductively joined with the one intermediate layer in said semiconductor element that is adjacent to said other outer layer; a rigid hollow cylindrical connector piece coaxially joined with said electrode, a hollow yieldable conductor having one end coaxially joined with said connector piece and having the other end conductively joined with said other housing portion; a lead connected to said contact and extending to the outside through said hollow conductor and through said other housing portion in insulated relation to both; a conducting sealing member traversing said other housing portion in coaxial relation thereto and having tubular shape, said lead for said contact extending coaxially into said sealing member and being conductively joined therewith, said sealing member being electrically insulated from said housing portion and from said hollow conductor.

7. The method of producing a semiconductor device which comprises forming a semiconductor element having four layers of alternately different conductance type wherein one outer layer is annular, disposing on the outer annular layer of the element a coaxially annular electrode, conductively joining to the intermediate layer in said semiconductor element that is adjacent to said outer annular layer a contact element passing through but insulated from said annular electrode, joining a rigid hollow cylindrical connector piece coaxially with said electrode, forming a yieldable hollow conductor from a hollow cylindrical conductor web, forcing respective tubular pieces of pressure-resistant tubes into the respective ends of the hollow conductor, pressing the ends of the hollow conductor together by external mechanical pressure, joining one of said tubes coaxially with said connector piece, connecting a lead to said contact and extending it through the hollow conductor, connecting one tube of said hollow conductor to one conductive portion of a surrounding housing having two mutually insulated portions while permitting the lead to pass insulatingly through the housing and connecting the other portion of the housing to the other outer layer, and sealing the housing.

8. Method for producing a semiconductor device according to claim 7 wherein the tubes of the hollow conductor are connected with the hollow cylindrical connector piece by one tube and with the other portion of the housing by the other tube in respectively separate fastening operations by cold deformation, to form electrically good conducting connections.

9. Encapsulated four-layer semiconductor device, comprising a semiconductor element having four layers of alternately different conductance type and having a large layer area relative to the thickness of each layer, a sealed housing having two mutually insulated portions of metal of which one is conductively connected with one of the outer layers of said element; the other of the outer layers being annular; an annular electrode disposed on the other outer layer of the element, a contact on said element surrounded by, but insulated from, said electrode and passing through the annular outer layer and conductively joined with the one intermediate layer in said semiconductor element that is adjacent to said annular outer layer; a rigid hollow cylindrical connector piece coaxially joined with said electrode, a hollow yieldable conductor having one end coaxially joined with said connector piece and having the other end conductively joined with said other housing portion; and a lead connected to said contact and extending to the outside through said hollow conductor and through said other housing portion in insulated relation to both.

No references cited.